(12) United States Patent
Maes et al.

(10) Patent No.: US 12,114,240 B2
(45) Date of Patent: Oct. 8, 2024

(54) ALLOCATING DIFFERENT TASKS TO A PLURALITY OF PRESENCE SENSOR SYSTEMS

(71) Applicant: SIGNIFY HOLDING B.V., Eindhoven (NL)

(72) Inventors: Jerome Eduard Maes, Eindhoven (NL); Peter Deixler, Arlington, MA (US); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 151 days.

(21) Appl. No.: 17/778,059

(22) PCT Filed: Nov. 11, 2020

(86) PCT No.: PCT/EP2020/081719
§ 371 (c)(1),
(2) Date: May 19, 2022

(87) PCT Pub. No.: WO2021/099189
PCT Pub. Date: May 27, 2021

(65) Prior Publication Data
US 2022/0417714 A1    Dec. 29, 2022

Related U.S. Application Data

(60) Provisional application No. 62/939,024, filed on Nov. 22, 2019.

(30) Foreign Application Priority Data

Dec. 16, 2019  (EP) ..................... 19216496

(51) Int. Cl.
H04W 4/38       (2018.01)
H04W 4/029      (2018.01)
H05B 47/115     (2020.01)

(52) U.S. Cl.
CPC ............. *H04W 4/38* (2018.02); *H04W 4/029* (2018.02); *H05B 47/115* (2020.01)

(58) Field of Classification Search
CPC   Y02B 20/40; G08B 13/19697; G08B 21/043; G08B 29/16; H04W 4/029;
(Continued)

(56) References Cited

U.S. PATENT DOCUMENTS 9,976,895 B2  5/2018  Miura et al.
9,999,114 B2  6/2018  Takenouchi et al.
(Continued)

FOREIGN PATENT DOCUMENTS

EP   1160751 A1   12/2001
EP   3033923 B1   11/2017
(Continued)

*Primary Examiner* — Dionne Pendleton (57) ABSTRACT

A controller (1) for performing presence detection with a first sensor system (41,42) and a second sensor system (31-37) is configured to receive sensor signals from the first sensor system and/or the second sensor system. The second sensor system is of a different type than the first sensor system. The controller is further configured to determine which first one or more areas of the plurality of areas are in both the sensor range of the first sensor system and the sensor range of the second sensor system based on the sensor signals and control the second sensor system to perform, with respect to the first one or more areas, a second task other than a first task to be performed by the first sensor system. The first task comprises obtaining sensor data to be used for presence detection in the first one or more areas.

20 Claims, 6 Drawing Sheets

(58) Field of Classification Search
CPC .......... H04W 4/38; G01S 13/04; G01S 15/04;
G01S 17/04; G06V 20/52; G06V 20/625;
G06V 2201/08; G06V 40/103; G08G
1/142; G08G 1/149; G08G 1/164; G08G
1/166; G08G 1/168; H02J 7/0045; H04L
12/10; H05B 47/11; H05B 47/115; H05B
47/18; H05B 47/19
See application file for complete search history.

(56) References Cited

U.S. PATENT DOCUMENTS

| | | |
|---|---|---|
| 10,244,401 B2 | 3/2019 | Farshchian et al. |
| 10,448,006 B2 | 10/2019 | Caicedo Fernandez et al. |
| 2018/0102858 A1 | 4/2018 | Tiwari et al. |
| 2018/0115876 A1 | 4/2018 | Maricic et al. |
| 2019/0223027 A1 | 7/2019 | Farshchian et al. |
| 2020/0389330 A1* | 12/2020 | Longardner .......... H02J 7/0045 |
| 2021/0201464 A1* | 7/2021 | Tariq .................... G06V 10/811 |

FOREIGN PATENT DOCUMENTS

| | | |
|---|---|---|
| EP | 3499323 A2 | 6/2019 |
| JP | 2017224526 A | 12/2017 |
| JP | 2019024025 A | 2/2019 |
| WO | 2012068064 A1 | 5/2012 |
| WO | 2013011395 A2 | 1/2013 |
| WO | 2013179175 A1 | 12/2013 |

\* cited by examiner

ALLOCATING DIFFERENT TASKS TO A PLURALITY OF PRESENCE SENSOR SYSTEMS

CROSS-REFERENCE TO PRIOR APPLICATIONS

This application is the U.S. National Phase application under 35 U.S.C. § 371 of International Application No. PCT/EP2020/081719, filed on Nov. 11, 2020, which claims the benefits of European Patent Application No. 19216496.0, filed on Dec. 16, 2019, and U.S. patent application Ser. No. 62/939,024, filed Nov. 22, 2019. These applications are hereby incorporated by reference herein.

FIELD OF THE INVENTION

The invention relates to a controller for performing presence detection with a first sensor system and a second sensor system.

The invention further relates to a method of performing presence detection with a first sensor system and a second sensor system.

The invention also relates to a computer program product enabling a computer system to perform such a method.

BACKGROUND OF THE INVENTION

In smart homes and smart offices, human presence detection is becoming increasingly important, e.g. to automatically switch on and off lights and automatically control heating/air-conditioning. Presence detection is often realized using PIR detectors or cameras. In the last few years, network-based presence sensing technologies have matured and appeared on the market. Notable example is Ivani's "network presence sensing" technology. Applications of this technology range from detecting motion based on a change in the environment to people counting and locating.

The main idea behind the technology, which is typically implemented using RF communications and referred to as RF-based sensing, is measuring the behavior of wireless communications (e.g. between IoT devices). The location and number of people, body weight, movement direction and other parameters will influence this behavior, such that based on the detected changes (e.g. variations in signal strength or Channel State Information (CSI)) a person or a group of people can be detected.

Due to the increasing popularity of presence sensor systems, it is more likely that multiple presence sensor systems have been installed in a building. Although it is possible to combine the output of two presence sensor systems to improve human presence detection, in a similar way as described in US 2018/0115876 A1 for position tracking, this is a waste of resources if one or both of the sensor systems are by itself already able to detect human presence sufficiently.

SUMMARY OF THE INVENTION

It is a first object of the invention to provide a controller, which creates an improved synergy between two presence sensor systems.

It is a second object of the invention to provide a method, which creates an improved synergy between two presence sensor systems.

In a first aspect of the invention, a controller for performing presence detection with a first sensor system and a second sensor system, said second sensor system being of a different type than said first sensor system, comprises at least one input interface, at least one output interface, and at least one processor configured to use said at least one input interface to receive sensor signals from said first sensor system and/or said second sensor system, determine which first one or more areas of a plurality of areas are in both said sensor range of said first sensor system and said sensor range of said second sensor system based on said sensor signals, and use said at least one output interface to control said second sensor system to perform, with respect to said first one or more areas, a second task other than a first task to be performed by said first sensor system, said first task comprising obtaining sensor data to be used for presence detection in said first one or more areas.

By determining in which area(s) there is overlap between the coverage of the two sensor systems and allocating a different task than presence detection to one of the two sensor system in an overlap area, while the other sensor system is responsible for the presence detection in the overlap area, the wasting of resource is reduced and an improved synergy between the two sensor systems is created. Said presence detection may comprise human presence detection and/or animal presence detection.

Said first sensor system may comprise one or more cameras and/or one or more microphones and/or one or more microwave sensors and/or one or more vibration sensors and/or one or more PIR sensors for performing said first task, for example. A presence detector that comprises a microwave sensor will normally project microwaves that bounce off surfaces and return to the microwave sensor. Said second sensor system may, for example, be configured to determine changes in, e.g. signal strength or Channel State Information (CSI), of received radio frequency signals for performing said second task.

Said second task may comprise at least one of: data communication, detecting a person's state, counting people, identifying a person, detecting an animal's state, counting animals, identifying animals, fall detection, heartbeat detection, gesture detection, gait detection, and breathing detection, for example. Detecting a person's state may comprising detecting a person's posture (e.g. stand, sit, lie down), a person's activity (e.g. watching TV, cooking or working) and/or activity level (e.g. ranging from quiet to restless), for example. To perform these seconds tasks, it may be beneficial to use different sensing nodes of an RF-based sensing system and/or use different transmission characteristics. For example, 5 GHz RF signals transmitted repeatedly at a frequency of 1600 Hz are typically preferred for fall detection, 60 GHz RF signals are typically preferred for presence detection confined to a certain room and longer lasting transmissions are typically preferred for data communication.

60 GHz RF-based sensing (which uses mm-wave) may also be used to determine heartbeat and perform gesture detection. Furthermore, 60 GHz WiFi provides steerable beams which can scan the outline of person by determining the radio-shade that the body causes between two sensing nodes. The outline can be used to determine the person's gait which is important for both identifying people as well as identifying medical issues (e.g. a person is not walking upright).

Therefore, said at least one processor may be configured to receive first sensor data with respect to said first one or more areas from said first sensor system and, based on said first sensor data, instruct said second sensor system which one or more nodes of said second sensor system to use for performing said second task and/or which one or more transmission characteristics to transmit one or more radio frequency signals with for performing said second task. Instructing the second sensor system which nodes to use may comprise instructing the second sensor system which transmitter-receiver group(s)/pair(s) to use. For example, nodes close to the ground may be preferred for fall detection.

Said at least one processor may be configured to use said at least one input interface to determine which second one or more areas of said plurality of areas are in said sensor range of said second sensor system and not in said sensor range of said first sensor system based on said sensor signals. This allows the output of the first sensor system with respect to an overlapping area to be used to improve presence detection in an area only covered by the second sensor system.

Said at least one processor may be configured to receive first sensor data with respect to said first one or more areas from said first sensor system and, based on said first sensor data, instruct said second sensor system which one or more nodes of said second sensor system to use for performing a third task and/or which one or more transmission characteristics to transmit one or more radio frequency signals with for performing said third task, said third task comprising obtaining third sensor data to be used for presence detection (e.g. human and/or animal presence detection) in said second one or more areas. For example, a camera-based sensor system may be used detect the height of a person and this height may be used to determine which one or more nodes the RF-based sensing system should use outside an overlap area.

Said at least one processor may be configured to receive second sensor data with respect to said first one or more areas from said second sensor system, compare said second sensor data with said first sensor data, and, based on said comparison, instruct said second sensor system which one or more nodes of said second sensor system to use for performing said third task and/or which one or more transmission characteristics to transmit one or more radio frequency signals with for performing said third task. For example, different transmission characteristics may be tried out if a person is detected by the first sensor system, but not by the second system. This may make it possible to automatically learn which transmission characteristics are good for RF-based sensing in the building in which the RF-based sensing system has been installed.

Said at least one processor may be configured to control said second sensor system to transmit one or more radio frequency signals with a first transmission characteristic in said first one or more areas and with a second transmission characteristic in said second one or more areas, said second transmission characteristic being different than said first transmission characteristic. Said first transmission characteristic may be associated with said second task and said second transmission characteristic may be associated with presence detection (e.g. human and/or animal presence detection), for example. For instance, said second sensor system may perform fall detection with 5 GHz RF signals in an overlapping area and presence detection with 60 GHz RF signals in a non-overlapping area.

Said at least one processor may be configured to receive first sensor data from said first sensor system and second sensor data from said second sensor system, said first sensor data being collected by said first sensor system and said second sensor data being collected by said second sensor system, and determine said first one or more areas based on said first sensor data and said second sensor data. This allows the system to learn over time in which areas both sensor systems are able to detect persons, i.e. to learn over time what the overlapping areas are, and makes it possible to use the system without calibration.

Said second sensor system may comprise a plurality of lighting devices, each of said lighting devices comprising a sensor, and said at least one processor may be configured to control said lighting devices to render light, receive initial sensor data from said first sensor system, said initial sensor data reflecting whether said light was captured by said first sensor system, and determine said first one or more areas based on said initial sensor data. This allows the system to make use of the improved synergy between the two presence sensor systems immediately after the initial calibration step.

Said at least one processor may be configured to use said at least one input interface to determine which third one or more areas of a plurality of areas are in a sensor range of said first sensor system and not in a sensor range of said second sensor system based on said sensor signals. This may be used to determine how to instruct the first sensor system, for example. For instance, if an area is only covered by a camera-based system, a comparison of sensor data of the two sensor systems in an overlapping may result in the conclusion that the sensitivity of the camera-based system needs to be increased.

In a second aspect of the invention, a method of performing presence detection with a first sensor system and a second sensor system, said second sensor system being of a different type than said first sensor system, comprises receiving sensor signals from said first sensor system and/or said second sensor system, determining which first one or more areas of a plurality of areas are in both said sensor range of said first sensor system and said sensor range of said second sensor system based on said sensor signals, and controlling said second sensor system to perform, with respect to said first one or more areas, a second task other than a first task to be performed by said first sensor system, said first task comprising obtaining sensor data to be used for presence detection in said first one or more areas. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for performing presence detection with a first sensor system and a second sensor system, said second sensor system being of a different type than said first sensor system.

The executable operations comprise receiving sensor signals from said first sensor system and/or said second sensor system, determining which first one or more areas of a plurality of areas are in both said sensor range of said first sensor system and said sensor range of said second sensor system based on said sensor signals, and controlling said second sensor system to perform, with respect to said first one or more areas, a second task other than a first task to be performed by said first sensor system, said first task comprising obtaining sensor data to be used for presence detection in said first one or more areas.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
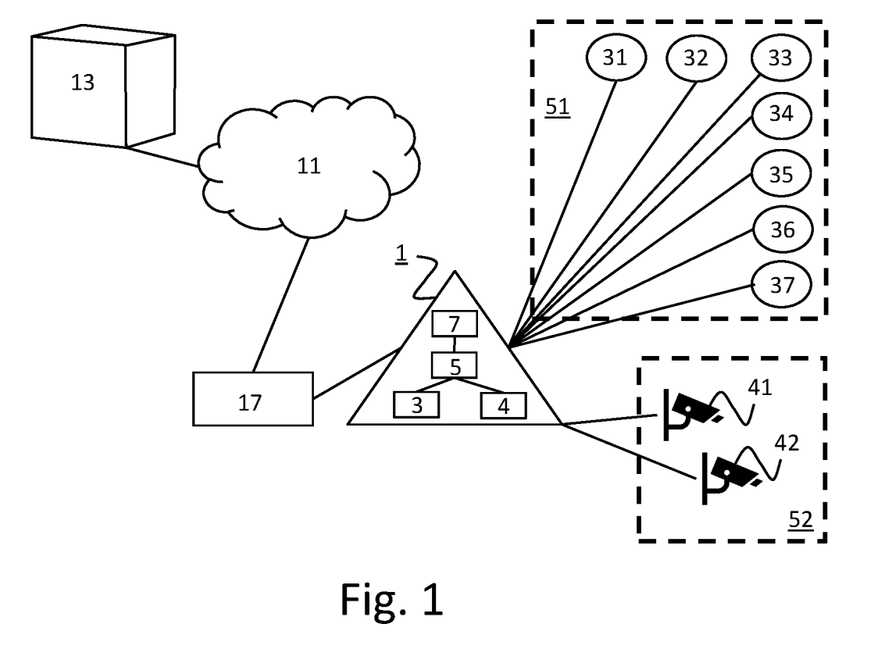
FIG. 1 is a block diagram of an embodiment of the system.

FIG. 1 shows an embodiment of the controller for performing presence detection with a first sensor system 52 and a second sensor system 51. In this embodiment, the controller is a device: a bridge 1. In an alternative embodiment, the controller is part of a device. The second sensor system 51 is of a different type than the first sensor system 52. In the example of FIG. 1, the first sensor system 52 comprises camera devices 41 and 42 and the second sensor system 51 comprises lighting devices 31-37.

In the example of FIG. 1, each of the lighting devices 31-37 comprises an RF receiver as sensor and is able to perform RF-based sensing using the RF receiver. In the example of FIG. 1, one or more RF signals are transmitted by one or more of the lighting devices 31-37. The one or more RF signals are received by the other of the lighting devices 31-37. The lighting devices 31-37 may be Hue lamps and the bridge 1 may be a Hue bridge, for example.

The bridge 1 and the lighting devices 31-37 may communicate via Zigbee, for example. The bridge 1 may be connected to a wireless LAN access point 17 via Ethernet or Wi-Fi, for example. In the example of FIG. 1, the wireless LAN access point 17 is connected to the Internet 11. In the example of FIG. 1, the bridge 1 and the camera devices 41 and 42 communicate directly, e.g. via Zigbee. Alternatively, the bridge 1 and the camera devices 41 and 42 may communicate via the wireless LAN access point 17.

The bridge 1 comprises a receiver 3, a transmitter 4, a processor 5, and a memory 7. The processor 5 is configured to use the receiver 3 to receive sensor signals from the first sensor system 52, i.e. the camera devices 41 and 42, and/or the second sensor system 51, i.e. the lighting devices 31-37, and determine which first one or more areas of the plurality of areas are in both the sensor range of the first sensor system 52 and the sensor range of the second sensor system 51 based on the sensor signals. This information may be stored in the memory 7 and/or on the Internet server 13, which is also connected to the Internet 11.

The processor 5 is further configured to use the transmitter 4 to control the second sensor system 51, i.e. lighting devices 31-37, to perform, with respect to the first one or more areas, a second task other than a first task to be performed by the first sensor system 52. The first task comprises obtaining sensor data to be used for presence detection in the first one or more areas.

In the example of FIG. 1, a first presence sensing system that comprises RF nodes and a second presence sensing system that comprises cameras have been installed in a building. The bridge 1 is configured to determine whether the second presence sensing system detects the presence of a person at the same time that the one or more RF nodes of the system detect the presence of the person. The bridge 1 may receive data from the RF nodes and from the second presence sensing system and determine when presence is detected by a camera of the second presence sensing system if presence is also detected at one or more RF nodes. Based on this determination, a task A may be assigned to the one or more RF nodes that have detected presence at the same time as the camera and a task B, e.g. a presence detection task, may be assigned to RF nodes that are not triggered at that time. Optionally, the bridge 1 may also assign a presence detection task to the camera.

If the lighting devices 31-37 are Wi-Fi lights and the camera devices 41-42 are Wi-Fi cameras, they may influence each other. Under certain circumstances, the streaming of the Wi-Fi camera may disturb the RF-based sensing, while in situations where the camera is (A) centrally placed within the building space (e.g. in the middle of an open plan office) and (B) is within wireless range of all Wi-Fi lights in the space, the video streaming may aid the RF-based sensing performance. The bridge 1 may therefore be configured to adjust the RF sensing strategy if the Wi-Fi camera is detected to be streaming, for instance by switching dual-radio Wi-Fi lights from Bluetooth Low Energy (BLE) to Wi-Fi communication.

In the example of FIG. 1, the first sensor system comprises one or more cameras that perform the first task. Alternatively or additionally, the first sensor system may comprise one or more microphones and/or one or more microwave sensors and/or one or more vibration sensors and/or one or more PIR sensors for performing the first task. In the example of FIG. 1, the second sensor system is configured to determine changes in signal strength of received radio frequency signals for performing the second task.

In the embodiment of FIG. 1, the controller, i.e. bridge 1, is not part of the first sensor system or the second sensor system. In an alternative embodiment, the controller, e.g. bridge 1, is part of the first sensor system or the second sensor system.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise solid-state memory, for example. The memory 7 may be used to store a table of connected lights, for example.

The receiver 3 and the transmitter 4 may use one or more wired or wireless communication technologies, e.g. Ethernet for communicating with the wireless LAN access point 17 and Zigbee for communicating with the lighting devices 31-37, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

In the embodiment of FIG. 1, the system of the invention comprises a bridge. In an alternative embodiment, the system of the invention is a different device, e.g. a central (home) control system or a smartphone. In the embodiment of FIG. 1, the system of the invention comprises a single device. In an alternative embodiment, the system of the invention comprises a plurality of devices.

Figure 2:
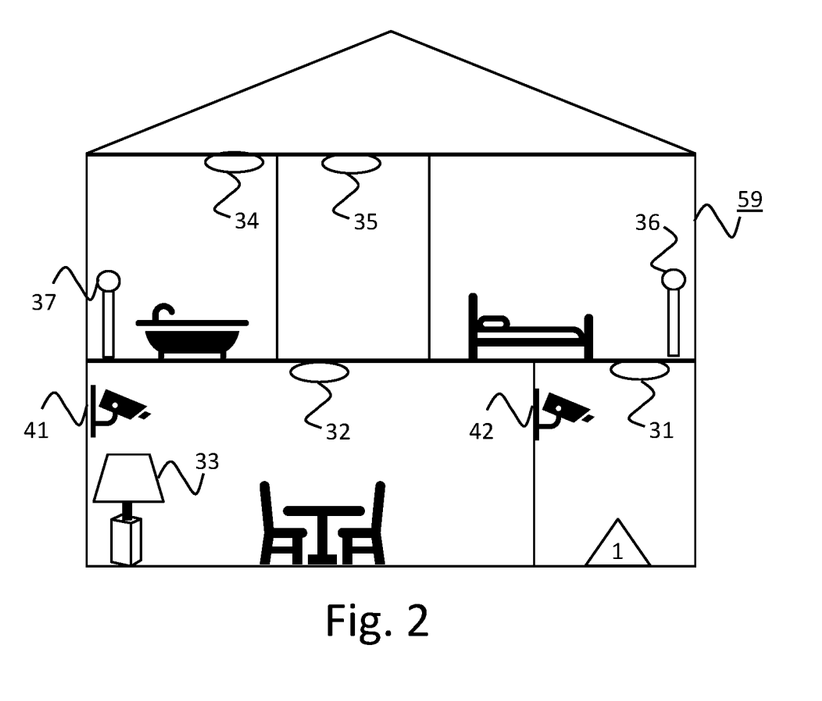
FIG. 2 shows an example of the system of FIG. 1 being used in a house.

FIG. 2 shows an example of the bridge 1 of FIG. 1 being used in a house 59. Lighting device 31 is placed in a hall on the ground floor of the house 59. Lighting devices 32 and 33 are placed in a living room on the ground floor of the house 59. Lighting devices 34 and 37 are placed in a bathroom on the second floor of the house 59. Lighting device 35 is placed in a hall on the second floor of the house 59. Lighting device 36 is placed in a bedroom on the second floor of the house 59.

Furthermore, camera 41 is placed in the living room on the ground floor of the house 59 and camera 42 is placed in the hall on the ground floor of the house 59. Thus, both the first sensor system and the second sensor system cover the living room and the hall on the ground floor of the house 59. Since it would be a waste of resources for both sensor systems to perform presence detection in these rooms, a sensor system may be assigned a different task for one or both of these rooms. For example, the first sensor system may be assigned a different task for the living room and the second sensor system may be assigned a different task for the hall.

Figure 3:
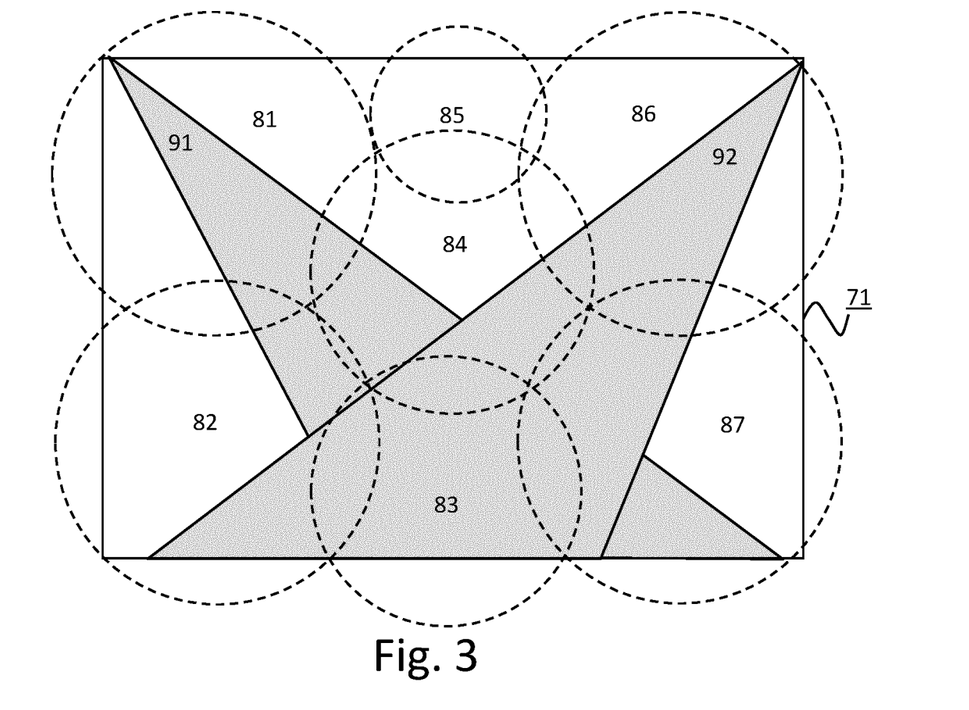
FIG. 3 shows a first example of coverage areas of two different sensor systems.

FIG. 3 shows a first example of coverage areas of two different sensor systems. A sensor system comprising RF nodes for presence sensing covers areas 81-87 of a building 71. A camera-based sensor system covers areas 91 and 92. In this example, the first areas determined by the bridge 1 of FIG. 1 correspond to areas 91 and 92, as all areas covered by the cameras are also covered by the RF nodes. The RF nodes for presence sensing may either detect presence of a user by detecting disturbance of the RF signal, or alternatively detect presence of a user by detecting the proximity of a personal RF device carried by the user or use a combination of both techniques.

The bridge 1 also determines which second one or more areas of the plurality of areas are in the sensor range of the second sensor system and not in the sensor range of the first sensor system. In the example of FIG. 3, the second areas are the areas 81-87 (and/or parts thereof) that do not overlap with areas 91 and 92. Area 85 is an example of a second area.

In an advanced embodiment, the camera-based sensor system captures sound in addition to images. In this embodiment, the controller may divide the RF nodes into three groups:

a first group of RF nodes of which the presence sensing area corresponds to the camera field-of-view;
a second group of RF nodes of which the presence sensing area corresponds to the audio range of the microphone of the camera which is outside the camera field-of-view; and
a third group of RF nodes of which the presence sensing area does not correspond to the camera field-of-view or the audio range.

Figure 4:
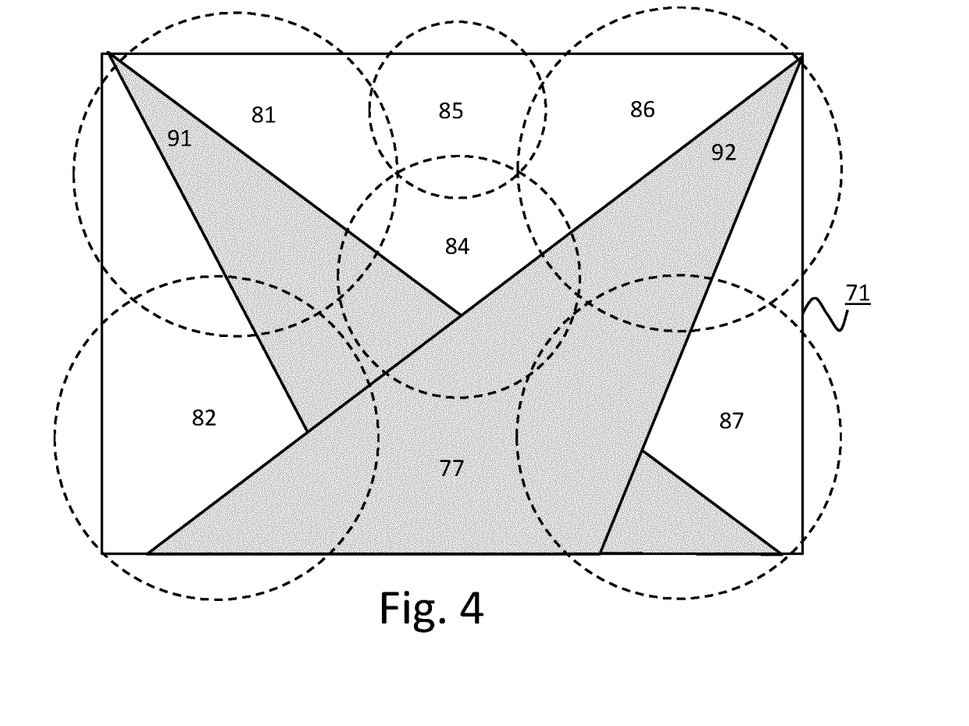
FIG. 4 shows a second example of coverage areas of two different sensor systems.

FIG. 4 shows a second example of coverage areas of two different sensor systems in the building 71. In this second example, less areas are covered by the RF nodes: areas 81-82 and 84-87. For instance, the cameras may be used to primarily cover the center of a warehouse where the best images of intruders can be obtained, while the RF-sensing may be predominantly used to cover the perimeter of the warehouse utilizing the ZigBee emergency lighting wall sconces mounted every few meters on the wall.

As a result, not all areas covered by the cameras are also covered by the RF nodes. In this situation, the bridge 1 might determine which third one or more areas of a plurality of areas are in a sensor range of the first sensor system and not in a sensor range of the second sensor system. Area 77 is an example of such a third area.

In the examples of FIGS. 3 and 4, the sensor ranges are represented by circles. However, compared to field-of-view sensors such as cameras and PIR sensors, RF-based sensing has ill-defined detection area, which is normally similar to an American football shape volumetric detection volume, but not constant over time and morphing in shape.

Figure 5:
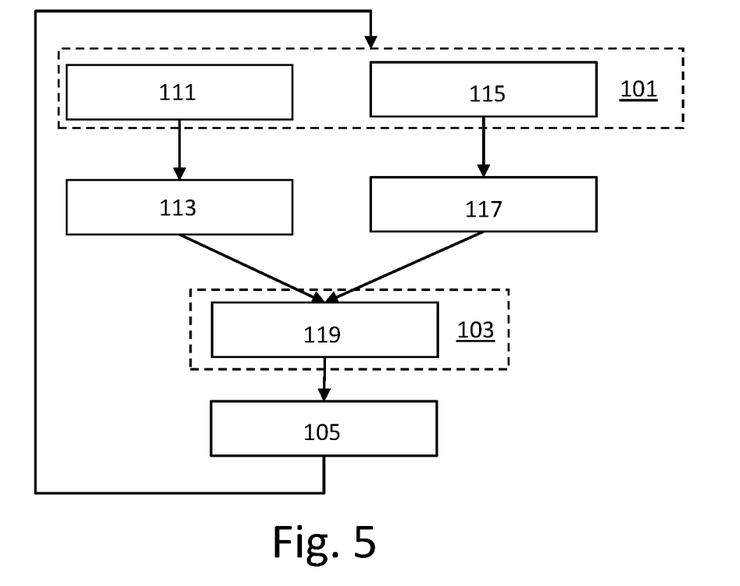
FIG. 5 is a flow diagram of a first embodiment of the method.

A first embodiment of performing presence detection with a first sensor system and a second sensor system is shown in FIG. 5. The second sensor system is of a different type than the first sensor system. A step 101 comprises receiving sensor signals from the first sensor system and/or the second sensor system. In the embodiment of FIG. 5, step 101 comprises sub steps 111 and 115. Step 111 comprises receiving first sensor data from the first sensor system. Step 115 comprises receiving second sensor data from the second sensor system.

A step 113 is performed after step 111. Step 113 comprises determine which areas are in the sensor range of the first sensor system based on the first sensor data. A step 117 is performed after step 115. Step 117 comprises determine which areas are in the sensor range of the second sensor system based on the second sensor data.

A step 103 comprises determining which first one or more areas of the plurality of areas are in both the sensor range of the first sensor system and the sensor range of the second sensor system based on the sensor signals. In the embodiment of FIG. 5, step 103 comprises a sub step 119. Step 119 comprises determining the first one or more areas based on the areas determined in steps 113 and 117, i.e. by determining where the determined areas overlap.

A step 105 comprises controlling the second sensor system to perform, with respect to the first one or more areas, a second task other than a first task to be performed by the first sensor system. The first task comprises obtaining sensor data to be used for presence detection in the first one or more areas.

Steps 111 and 115 are repeated after step 105. The first sensor data received in the next iteration of step 111 has been collected by the first sensor system performing the first task. The second sensor data received in the second iteration of step 115 has been collected by the second sensor system performing the second task.

The steps of FIG. 5 may be used, for example, to learn over time in which areas both RF nodes and the second presence sensing system can detect the presence of a person.

Auto-correlation maybe performed to determine which RF node coverage areas overlap with a camera field-of-view. If for certain pairs of RF nodes, the RF field is disturbed by a human and/or animal without the camera being triggered, it may be concluded that those pairs of lights monitor an area in the house where there is no camera coverage. In addition, it is possible to auto-correlate which RF nodes are just outside the camera field-of-view and hence may be used to complement a camera.

Preferably, the controller monitors the disturbances of the RF field for all possible combinations of RF nodes and, based thereon, determines which sets of sensing pairs correlate with the field-of-view of a camera. As wireless signal path is influenced by building materials and physical structure of a house (very non-homogenous), RF-sensing pairs at a seemingly odd positions may give the best sensing results.

Not all wireless lighting nodes may be assigned to do RF-based sensing and this assignment may change over time. For example, depending on the condition of camera (e.g. on vs off vs night vision mode), different wireless lighting nodes may be assigned to do RF-based sensing. For instance, if a camera is on, a wireless lighting node covering the same area as the camera may be assigned to do data communication.

Figure 6:
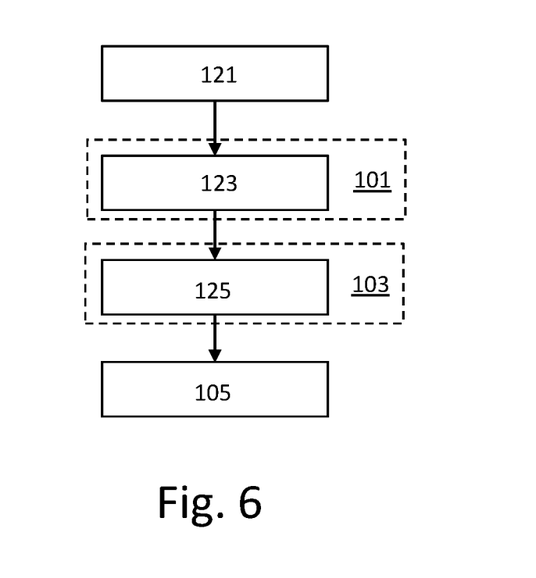
FIG. 6 is a flow diagram of a second embodiment of the method.

A second embodiment of performing presence detection with a first sensor system and a second sensor system is shown in FIG. 6. In this second embodiment, the second sensor system comprises a plurality of lighting devices that each comprise a sensor (in addition to one or more light sources) and which form the nodes of the second sensor system. A step 121 comprises controlling the lighting devices to render light in an initial stage. In the embodiment of FIG. 6, step 101 comprises a sub step 123. Step 123 comprises receive initial sensor data from the first sensor system, e.g. a camera-based system. The initial sensor data reflects whether the light was captured by the first sensor system.

In the embodiment of FIG. 6, step 103 comprises a sub step 125. Step 125 comprises determining the first one or more areas, i.e. the areas that are in the range of both sensor systems, based on the initial sensor data. If a camera of the first sensor system is able to see light emitted by a lighting device of the second sensor system, this normally means that there is overlap between the sensor range of this camera and the sensor range of the sensor of this lighting device. In the embodiment of FIG. 6, steps 101-105 are not continuously repeated, but the method is carried out again when there is a change to the first sensor system and/or the second sensor system.

Accordingly, a controller may be configured to determine whether the light output of the light nodes is visible in the camera image and use this information to assign tasks to the lighting devices, e.g. RF nodes.

Figure 7:
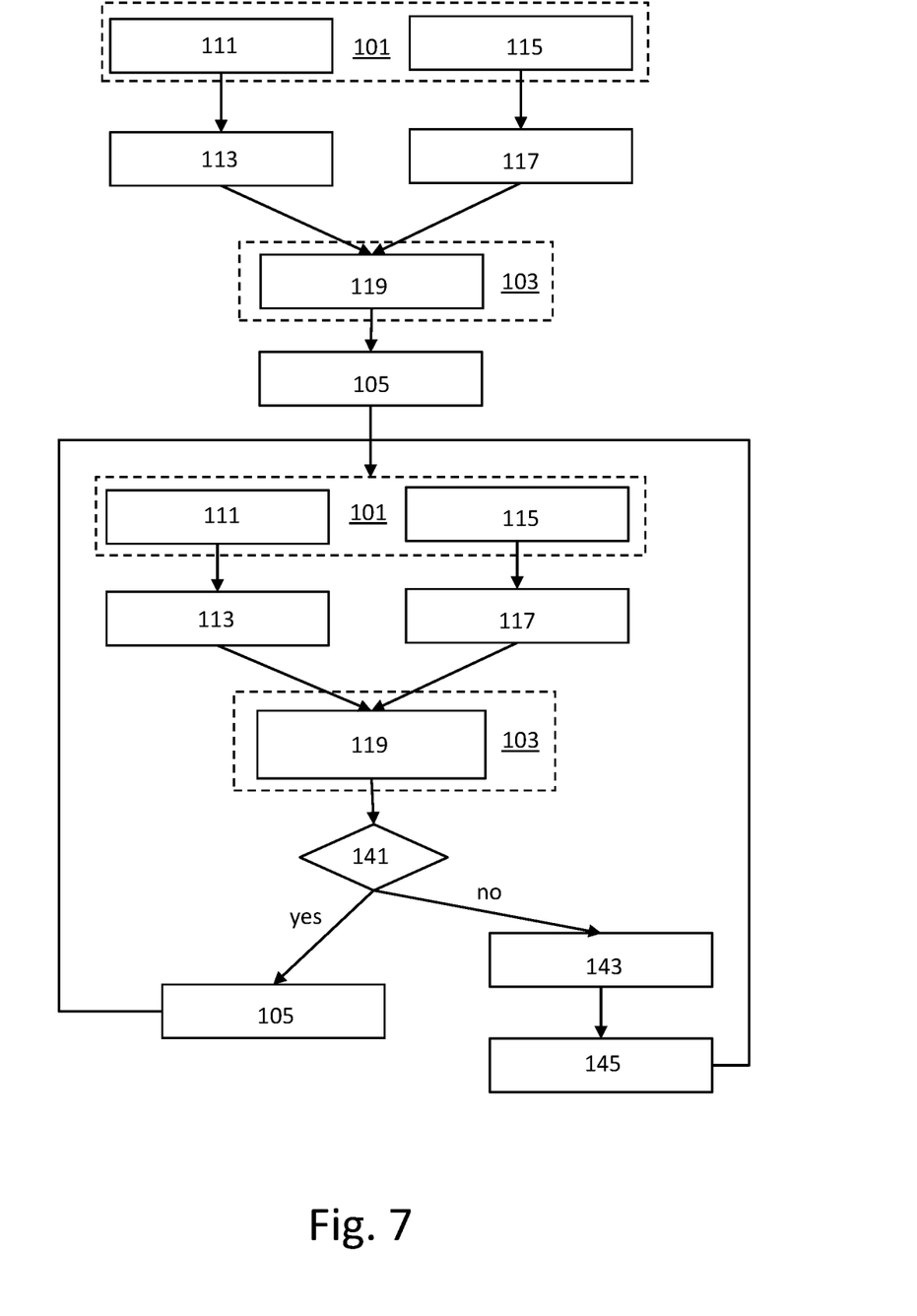
FIG. 7 is a flow diagram of a third embodiment of the method.

A third embodiment of performing presence detection with a first sensor system and a second sensor system is shown in FIG. 7. This third embodiment is an extension of the first embodiment of FIG. 5. In this third embodiment, the second task that the second sensor system is controlled to perform with respect to the first one or more areas (in step 105) comprises at least one of: data communication, detecting a person's state, counting people, identifying a person, detecting an animal's state, counting animals, identifying animals, fall detection, heartbeat detection, gesture detection, gait detection, and breathing detection.

After steps 101-103 (including steps 113 and 117) have been performed a second time, a step 141 is performed. Step 141 comprises checking whether the first one or more areas determined in the current iteration of step 119 are different than the first one or more areas determined in the previous iteration of step 119. If so, then step 105 is performed again. Step 105 comprises controlling the second sensor system to perform the second task with respect to the first one or more areas as determined in the current iteration of step 119.

If it is determined in step 141 that the first one or more areas determined in the current iteration of step 119 are not different than the first one or more areas determined in the previous iteration of step 119, then step 143 is performed. Step 143 comprises analyzing the first sensor data received in step 111 with respect to the first one or more areas determined in step 119. Step 143 further comprises determining, based on this analysis, which one or more nodes of the second sensor system to use for performing the second task and/or which one or more transmission characteristics to transmit one or more radio frequency signals with for performing the second task.

A step 145 is performed after step 143. Step 145 comprises instructing the second sensor system which one or more nodes of the second sensor system to use for performing the second task and/or which one or more transmission characteristics to transmit one or more radio frequency signals with for performing the second task. Steps 111 and 115 are repeated after step 105 or step 145 has been performed.

Not only are preferably different transmission characteristics and/or nodes used for performing the second task than for presence detection, also the analysis of the data may be different. Thus, RF data from RF nodes that have been assigned the second task, i.e. task A, in the overlapping areas may be analyzed differently compared to RF data from RF nodes that have been assigned a presence detection task, i.e. task B, in the non-overlapping areas.

RF-based sensing may or may not be confined by the walls of a house. For instance, RF-based sensing based on 2.4 GHz Zigbee radio penetrates the walls (and the ZigBee radio certainly cannot detect reflections), while a modern Wi-Fi radio will see reflections of the wall (certainly for higher frequency Wi-Fi such as 60 GHz). Depending on whether the camera is on/off, i.e. whether the RF nodes need to perform presence detection or not, a different radio frequency or signal strength in the RF nodes, e.g. lighting devices, may be activated, either to increase or decrease sensor range.

If presence detection needs to be confined to a room, a frequency of 60 GHz is preferable. If presence detection does not need to be confined to a room, a frequency of 2.4 GHz is preferable. For data communication, both 2.4 GHz and 60 GHz are suitable, but longer lasting transmissions are more efficient and therefore preferable. For fall, detection, 5 GHz RF transmissions are preferably used, and the RF transmissions are preferably equally spread over time at a frequency of 1600 Hz.

For breathing detection (vital signs detection), a frequency of 40 Hz is typically sufficient. For presence detection (occupancy detection), a frequency of 20 Hz is typically sufficient. These frequencies are not to be confused with the frequencies of the RF signals themselves (e.g. 2.4 GHz, 5 GHz or 60 GHz). Minor motion detection is usually performed for breathing detection, while major motion detection is normally performed for presence detection.

Figure 8:
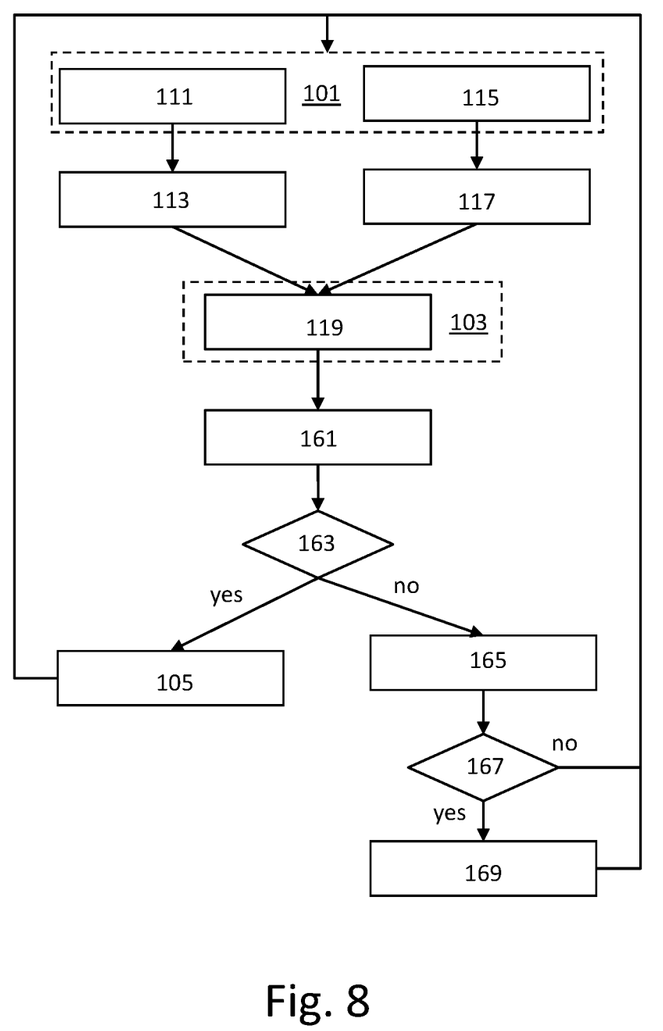
FIG. 8 is a flow diagram of a fourth embodiment of the method.

A fourth embodiment of performing presence detection with a first sensor system and a second sensor system is shown in FIG. 8. This fourth embodiment is an extension of the first embodiment of FIG. 5. In the embodiment of FIG. 8, a step 161 is performed after step 119. Step 161 comprises determining which second one or more areas of the plurality of areas are in the sensor range of the second sensor system and not in the sensor range of the first sensor system based on the sensor signals. Optionally, step 161 comprises determining which (if any) third one or more areas of a plurality of areas are in a sensor range of the first sensor system and not in a sensor range of the second sensor system based on the sensor signals.

Next, a step 163 comprises determining whether the areas determined in the current iteration of step 161 have changed compared to the previous iteration of step 161, e.g. due to changes in one or both sensor systems. If so, then step 105 is performed and steps 111 and 115 are repeated after step 105. If not, a step 165 is performed. Step 105 comprises controlling the second sensor system to perform the second task with respect to the first one or more areas determined in the current iteration of step 119. Step 105 may comprise instructing the second sensor system which one or more nodes of the second sensor system to use for performing the second task and/or which one or more transmission characteristics to transmit one or more radio frequency signals with for performing the second task.

Step 165 comprises comparing the second sensor data received in step 115 with the first sensor data received in step 111. Step 165 further comprises determining, based on the comparison, which one or more nodes of the second sensor system to use for performing a third task and/or which one or more transmission characteristics to transmit one or more radio frequency signals with for performing the third task. The third task comprises obtaining third sensor data to be used for presence detection in the second one or more areas.

Next, a step 167 comprises determining whether the one or more nodes and/or the one or more transmission characteristics determined in the current iteration of step 165 are different than the one or more nodes and/or the one or more transmission characteristics determined in the previous iteration of step 165. If not, steps 111 and 115 are repeated. If so, a step 169 is performed.

Step 169 comprises instructing the second sensor system which one or more nodes of the second sensor system to use for performing the third task and/or which one or more transmission characteristics to transmit one or more radio frequency signals with for performing the third task.

Thus, the second sensor system may be controlled to transmit one or more radio frequency signals with a first transmission characteristic in the first one or more areas in step 105 and with a second transmission characteristic in the second one or more areas in step 169. The second transmission characteristic is preferably different from the first transmission characteristic. The first transmission characteristic may be associated with the second task and the second transmission characteristic may be associated with presence detection, for example.

The frequency, signal strength, etc. of transmitted RF signals may vary, for instance to reduce power or to reduce network traffic. The carrier frequency of the transmission may also vary, for instance from 2.4 GHz Wi-Fi vs 5 GHz Wi-Fi vs 60 GHz Wi-Fi. Furthermore, the protocol used by the lighting system may vary (e.g. from BLE for low power consumption to Wi-Fi for context rich RF-based sensing).

The controller may employ a handover mechanism when a person is moving within a house from a first area with both camera and RF-based sensing coverage to a second area with RF sensing coverage, but no camera coverage. The camera system provides information about the directionality of the person's movement and provides metadata of the person (e.g. classification of body size, identity of the person) to the RF-based sensing system.

The controller may perform a system optimization/calibration while the person is still within the space covered by the camera. For instance, the controller may assign those RF-sensing pairs of lights which show best correlation with the ground truth established by the camera for this specific person (e.g. for a small child with 1-meter height, use of the table lights as RF sensing pair is preferable, while for an adult, use of the two ceiling lights as RF sensing pair is preferable). Once the person leaves the field-of-view of the camera, the RF-based sensing system takes over on its own.

When the person re-enters the field-of-view of the camera, the ground truth can be established again by the camera and the RF-sensing system goes back and updates its recent calculations, which will improve the RF sensing performance in the near future. The above is especially beneficial if the RF-based sensing system is used for people counting and people keep moving into and leaving the field-of-view of the camera.

The embodiments of both FIG. 7 and FIG. 8 are extensions of the embodiment of FIG. 5. In an alternative embodiment, the embodiment of FIG. 6 is extended in a similar manner as described in relation to FIGS. 7 and 8.

Figure 9:
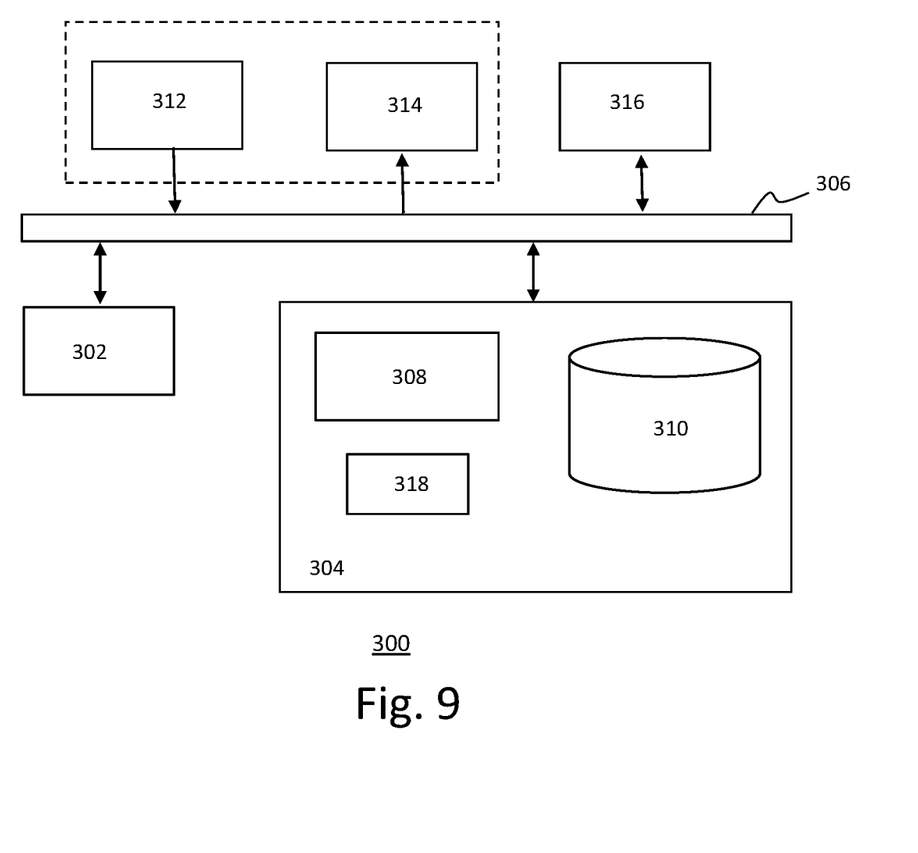
FIG. 9 is a block diagram of an exemplary data processing system for performing the method of the invention.

FIG. 9 depicts a block diagram illustrating an exemplary data processing system that may perform the method as described with reference to FIGS. 5 to 8.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 9 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A controller for performing presence detection with a first sensor system and a second sensor system, said second sensor system being of a different type than said first sensor system, said controller comprising:
    at least one input interface;
    at least one output interface; and
    at least one processor configured to:
        use said at least one input interface to receive sensor signals from said first sensor system and said second sensor system,
        determine which first one or more areas of a plurality of areas are in both said sensor range of said first sensor system and said sensor range of said second sensor system based on said sensor signals, and
        use said at least one output interface to control, responsive to determining the first one or more areas of a plurality of areas are in both said sensor range of said first sensor system and said sensor range of said second sensor system, said second sensor system to perform, with respect to said first one or more areas, a second task other than a first task to be performed by said first sensor system, said first task comprising obtaining sensor data to be used for presence detection in said first one or more areas.

2. The controller as claimed in claim 1, wherein said first sensor system comprises at least one camera and/or at least one microwave sensor and/or at least one microphone and/or at least one vibration sensor and/or at least one PIR sensor for performing said first task.

3. The controller as claimed in claim 1, wherein said second sensor system is configured to determine changes in received radio frequency signals for performing said second task.

4. The controller as claimed in claim 1, wherein said second task comprises at least one of: data communication, detecting a person's state, counting people, identifying a person, detecting an animal's state, counting animals, identifying animals, fall detection, heartbeat detection, gesture detection, gait detection and breathing detection.

5. The controller as claimed in claim 4, wherein said at least one processor is configured to receive first sensor data with respect to said first one or more areas from said first sensor system and, based on said first sensor data, instruct said second sensor system which one or more nodes of said second sensor system to use for performing said second task and/or which one or more transmission characteristics to transmit one or more radio frequency signals with for performing said second task.

6. The controller as claimed in claim 1, wherein said at least one processor is configured to receive first sensor data from said first sensor system and second sensor data from said second sensor system, said first sensor data being collected by said first sensor system and said second sensor data being collected by said second sensor system, and determine said first one or more areas based on said first sensor data and said second sensor data.

7. The controller as claimed in claim 1, wherein said second sensor system comprises a plurality of lighting devices, each of said lighting devices comprising a sensor, and said at least one processor is configured to control said lighting devices to render light, receive initial sensor data from said first sensor system, said initial sensor data reflecting whether said light was captured by said first sensor system, and determine said first one or more areas based on said initial sensor data.

8. The controller as claimed in claim 1, wherein said at least one processor is configured to use said at least one input interface to determine which third one or more areas of a plurality of areas are in a sensor range of said first sensor system and not in a sensor range of said second sensor system based on said sensor signals.

9. A method of performing presence detection with a first sensor system and a second sensor system, said second sensor system being of a different type than said first sensor system, comprising:
receiving sensor signals from said first sensor system and said second sensor system;
determining which first one or more areas of a plurality of areas are in both said sensor range of said first sensor system and said sensor range of said second sensor system based on said sensor signals; and
controlling, responsive to determining the first one or more areas of a plurality of areas are in both said sensor range of said first sensor system and said sensor range of said second sensor system, said second sensor system to perform, with respect to said first one or more areas, a second task other than a first task to be performed by said first sensor system, said first task comprising obtaining sensor data to be used for presence detection in said first one or more areas.

10. A non-transitory computer readable medium comprising instructions, the instructions, when executed by a computer system, being configured for enabling the method of claim 9 to be performed.

11. A controller for performing presence detection with a first sensor system and a second sensor system, said second sensor system being of a different type than said first sensor system, said controller comprising:
at least one input interface;
at least one output interface; and
at least one processor configured to:
use said at least one input interface to receive sensor signals from said first sensor system and said second sensor system,
determine which first one or more areas of a plurality of areas are in both said sensor range of said first sensor system and said sensor range of said second sensor system based on said sensor signals, use said at least one output interface to control said second sensor system to perform, with respect to said first one or more areas, a second task other than a first task to be performed by said first sensor system, said first task comprising obtaining sensor data to be used for presence detection in said first one or more areas, and
determine which second one or more areas of said plurality of areas are in said sensor range of said second sensor system and not in said sensor range of said first sensor system based on said sensor signals.

12. The controller as claimed in claim 11, wherein said at least one processor is configured to receive first sensor data with respect to said first one or more areas from said first sensor system and, based on said first sensor data, instruct said second sensor system which one or more nodes of said second sensor system to use for performing a third task and/or which one or more transmission characteristics to transmit one or more radio frequency signals with for performing said third task, said third task comprising obtaining third sensor data to be used for presence detection in said second one or more areas.

13. The controller as claimed in claim 12, wherein said at least one processor is configured to receive second sensor data with respect to said first one or more areas from said second sensor system, compare said second sensor data with said first sensor data, and, based on said comparison, instruct said second sensor system which one or more nodes of said second sensor system to use for performing said third task and/or which one or more transmission characteristics to transmit one or more radio frequency signals with for performing said third task.

14. The controller as claimed in claim 11, wherein said at least one processor is configured to control said second sensor system to transmit one or more radio frequency signals with a first transmission characteristic in said first one or more areas and with a second transmission characteristic in said second one or more areas, said second transmission characteristic being different than said first transmission characteristic.

15. The controller as claimed in claim 14, wherein said first transmission characteristic is associated with said second task and said second transmission characteristic is associated with presence detection.

16. The controller as claimed in claim 11, wherein said first sensor system comprises at least one camera and/or at least one microwave sensor and/or at least one microphone and/or at least one vibration sensor and/or at least one PIR sensor for performing said first task.

17. The controller as claimed in claim 11, wherein said second sensor system is configured to determine changes in received radio frequency signals for performing said second task.

18. The controller as claimed in claim 11, wherein said second task comprises at least one of: data communication, detecting a person's state, counting people, identifying a person, detecting an animal's state, counting animals, identifying animals, fall detection, heartbeat detection, gesture detection, gait detection and breathing detection.

19. The controller as claimed in claim 18, wherein said at least one processor is configured to receive first sensor data with respect to said first one or more areas from said first sensor system and, based on said first sensor data, instruct said second sensor system which one or more nodes of said second sensor system to use for performing said second task and/or which one or more transmission characteristics to transmit one or more radio frequency signals with for performing said second task.

20. The controller as claimed in claim 11, wherein said second sensor system comprises a plurality of lighting devices, each of said lighting devices comprising a sensor, and said at least one processor is configured to control said lighting devices to render light, receive initial sensor data from said first sensor system, said initial sensor data reflecting whether said light was captured by said first sensor system, and determine said first one or more areas based on said initial sensor data.

* * * * *